US010685173B2

(12) United States Patent
Bastide et al.

(10) Patent No.: US 10,685,173 B2
(45) Date of Patent: Jun. 16, 2020

(54) FORMATTING TABLES WITH COMPLEX PATTERNS

(71) Applicant: INTERNATIONAL BUSINESS MACHINES CORPORATION, Armonk, NY (US)

(72) Inventors: Paul R Bastide, Boxford, MA (US); Mark Gargan, Inchcicore (IE); Fred Raguillat, Meath (IE)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 14/827,576

(22) Filed: Aug. 17, 2015

(65) Prior Publication Data

US 2017/0052941 A1    Feb. 23, 2017

(51) Int. Cl.
| | |
|---|---|
| *G06F 17/00* | (2019.01) |
| *G06F 40/177* | (2020.01) |
| *G06F 40/18* | (2020.01) |
| *G06F 40/103* | (2020.01) |
| *G06F 3/0484* | (2013.01) |

(52) U.S. Cl.
CPC ........ *G06F 40/177* (2020.01); *G06F 3/04842* (2013.01); *G06F 40/103* (2020.01); *G06F 40/18* (2020.01)

(58) Field of Classification Search
None
See application file for complete search history.

(56) References Cited

U.S. PATENT DOCUMENTS

| 5,613,131 A | 3/1997 | Moss et al. |
| 9,959,265 B1* | 5/2018 | Vagell ................. G06F 17/245 |
| 2002/0062342 A1* | 5/2002 | Sidles .................. G06F 17/243 |
| | | 709/203 |
| 2008/0294406 A1* | 11/2008 | Hachmeister .......... G06N 3/004 |
| | | 703/11 |
| 2009/0044090 A1* | 2/2009 | Gur ...................... G06F 17/246 |
| | | 715/212 |
| 2010/0083086 A1 | 4/2010 | Berger et al. |
| 2012/0192051 A1 | 7/2012 | Rothschiller et al. |
| 2013/0091132 A1* | 4/2013 | Khalatov ....... G06Q 10/063118 |
| | | 707/732 |

(Continued)

OTHER PUBLICATIONS

Wikipedia, "Natural Language Processing," http://en.wikipedia.org/w/index.php?title=natural_language_processing&oldid=660301526, downloaded on May 4, 2015, pp. 1-10.

(Continued)

*Primary Examiner* — Mustafa A Amin
(74) *Attorney, Agent, or Firm* — Reza Sarbakhsh (57) ABSTRACT

A method, computer program product, and computer system for detecting creation of a first portion of a table and a second portion of the table, wherein the first portion of the table may include a first label and wherein the second portion of the table may include a second label. It may be determined that a pattern exists between the first label and the second label based upon, at least in part, historical use of the first label relative to the second label. The pattern between the first label and the second label may be automatically recreated in a third portion of the table and a fourth portion of the table based upon, at least in part, receiving at least a portion of the first label in the third portion of the table.

13 Claims, 8 Drawing Sheets

(56) References Cited

U.S. PATENT DOCUMENTS

| | | | | |
|---|---|---|---|---|
| 2013/0110792 A1* | 5/2013 | Hudis | ............... | G06F 17/30297 |
| | | | | 707/692 |
| 2013/0124960 A1* | 5/2013 | Velingkar | ............. | G06F 17/246 |
| | | | | 715/220 |
| 2013/0191714 A1* | 7/2013 | Rothschiller | ......... | G06F 17/243 |
| | | | | 715/226 |
| 2014/0115434 A1 | 4/2014 | Chirilov et al. | | |
| 2014/0122535 A1* | 5/2014 | Gerard | ................... | G06F 17/30 |
| | | | | 707/802 |
| 2014/0372857 A1* | 12/2014 | Otero | ................... | G06F 17/246 |
| | | | | 715/220 |
| 2015/0363382 A1* | 12/2015 | Bohra | .................... | G06F 17/27 |
| | | | | 704/9 |
| 2016/0055139 A1* | 2/2016 | Creason | ............... | G06F 17/246 |
| | | | | 715/217 |
| 2016/0292240 A1* | 10/2016 | Diwan | .................. | G06F 16/254 |
| 2017/0052941 A1* | 2/2017 | Bastide | ................ | G06F 17/245 |
| 2017/0147643 A1* | 5/2017 | Zaidi | ................ | G06F 17/30466 |

OTHER PUBLICATIONS

IBM, "SPSS Regression," http://www-03.ibm.com/software/products/en/spss-regression, downloaded on May 5, 2015, pp. 1-3.

IBM, "SPSS Statistics," http://www-01.ibm.com/software/analytics/spss/products/statistics/, downloaded on May 4, 2015, pp. 1-2.

IBM, "SPSS Text analytics for Surveys," http:/www-03.ibm.com/software/products/en/spss-text-analytics-surveys, downloaded on May 4, 2015, pp. 1-2.

Appendix P: IBM Patent Applications to Be Treated as Related, filed May 4, 2016, pp. 1-2.

For Examiner's Eyes Only, Related U.S. Appl. No. 15/146,103, filed May 4, 2016, System and Method for Automated Formatting of Tables, pp. 1-27.

\* cited by examiner

FORMATTING TABLES WITH COMPLEX PATTERNS

BACKGROUND

In addition to desktops and laptops, to make users more agile and enable a fully connected employee, users (e.g., sales, tech sales, etc.) may find it beneficial to use smaller devices, such as tablets and smartphones. When using these smaller devices with traditional office productivity applications (e.g., word processing, presentations, spreadsheets, etc.), it may be difficult to navigate the productivity application, e.g., Form Factor, Full Screen, Infinite Scroll, Multi-Touch, Limited Resources, Menus/Properties Dialogs, etc. For example, when using spreadsheets on tablets, the smaller user interface may make it difficult, time consuming, and/or tedious to create spreadsheets, and/or their associated columns and rows.

BRIEF SUMMARY OF DISCLOSURE

In one example implementation, a method, performed by one or more computing devices, may include but is not limited to detecting, by a computing device, creation of a first portion of a table and a second portion of the table, wherein the first portion of the table may include a first label and wherein the second portion of the table may include a second label. It may be determined that a pattern exists between the first label and the second label based upon, at least in part, historical use of the first label relative to the second label. The pattern between the first label and the second label may be automatically recreated in a third portion of the table and a fourth portion of the table based upon, at least in part, receiving at least a portion of the first label in the third portion of the table.

One or more of the following example features may be included. At least one of the first portion and the second portion may include at least one of a column and a row of the table. At least one of the first label and the second label may include a column heading. The historical use of the first label relative to the second label may be from at least one of a same table and a different table. Automatically recreating the pattern between the first label and the second label may include utilizing a formatting of the first portion of the table in the third portion of the table and the second portion of the table in the fourth portion of the table. Automatically recreating the pattern between the first label and the second label may include utilizing the first label of the first portion of the table in the third portion of the table and the second label of the second portion of the table in the fourth portion of the table. A prompt for selection of the pattern to be used may be provided when automatically recreating the pattern.

In another example implementation, a computing system includes a processor and a memory configured to perform operations that may include but are not limited to detecting creation of a first portion of a table and a second portion of the table, wherein the first portion of the table may include a first label and wherein the second portion of the table may include a second label. It may be determined that a pattern exists between the first label and the second label based upon, at least in part, historical use of the first label relative to the second label. The pattern between the first label and the second label may be automatically recreated in a third portion of the table and a fourth portion of the table based upon, at least in part, receiving at least a portion of the first label in the third portion of the table.

One or more of the following example features may be included. At least one of the first portion and the second portion may include at least one of a column and a row of the table. At least one of the first label and the second label may include a column heading. The historical use of the first label relative to the second label may be from at least one of a same table and a different table. Automatically recreating the pattern between the first label and the second label may include utilizing a formatting of the first portion of the table in the third portion of the table and the second portion of the table in the fourth portion of the table. Automatically recreating the pattern between the first label and the second label may include utilizing the first label of the first portion of the table in the third portion of the table and the second label of the second portion of the table in the fourth portion of the table. A prompt for selection of the pattern to be used may be provided when automatically recreating the pattern.

In another example implementation, a computer program product resides on a computer readable storage medium that has a plurality of instructions stored on it. When executed by a processor, the instructions cause the processor to perform operations that may include but are not limited to detecting creation of a first portion of a table and a second portion of the table, wherein the first portion of the table may include a first label and wherein the second portion of the table may include a second label. It may be determined that a pattern exists between the first label and the second label based upon, at least in part, historical use of the first label relative to the second label. The pattern between the first label and the second label may be automatically recreated in a third portion of the table and a fourth portion of the table based upon, at least in part, receiving at least a portion of the first label in the third portion of the table.

One or more of the following example features may be included. At least one of the first portion and the second portion may include at least one of a column and a row of the table. At least one of the first label and the second label may include a column heading. The historical use of the first label relative to the second label may be from at least one of a same table and a different table. Automatically recreating the pattern between the first label and the second label may include utilizing a formatting of the first portion of the table in the third portion of the table and the second portion of the table in the fourth portion of the table. Automatically recreating the pattern between the first label and the second label may include utilizing the first label of the first portion of the table in the third portion of the table and the second label of the second portion of the table in the fourth portion of the table. A prompt for selection of the pattern to be used may be provided when automatically recreating the pattern.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
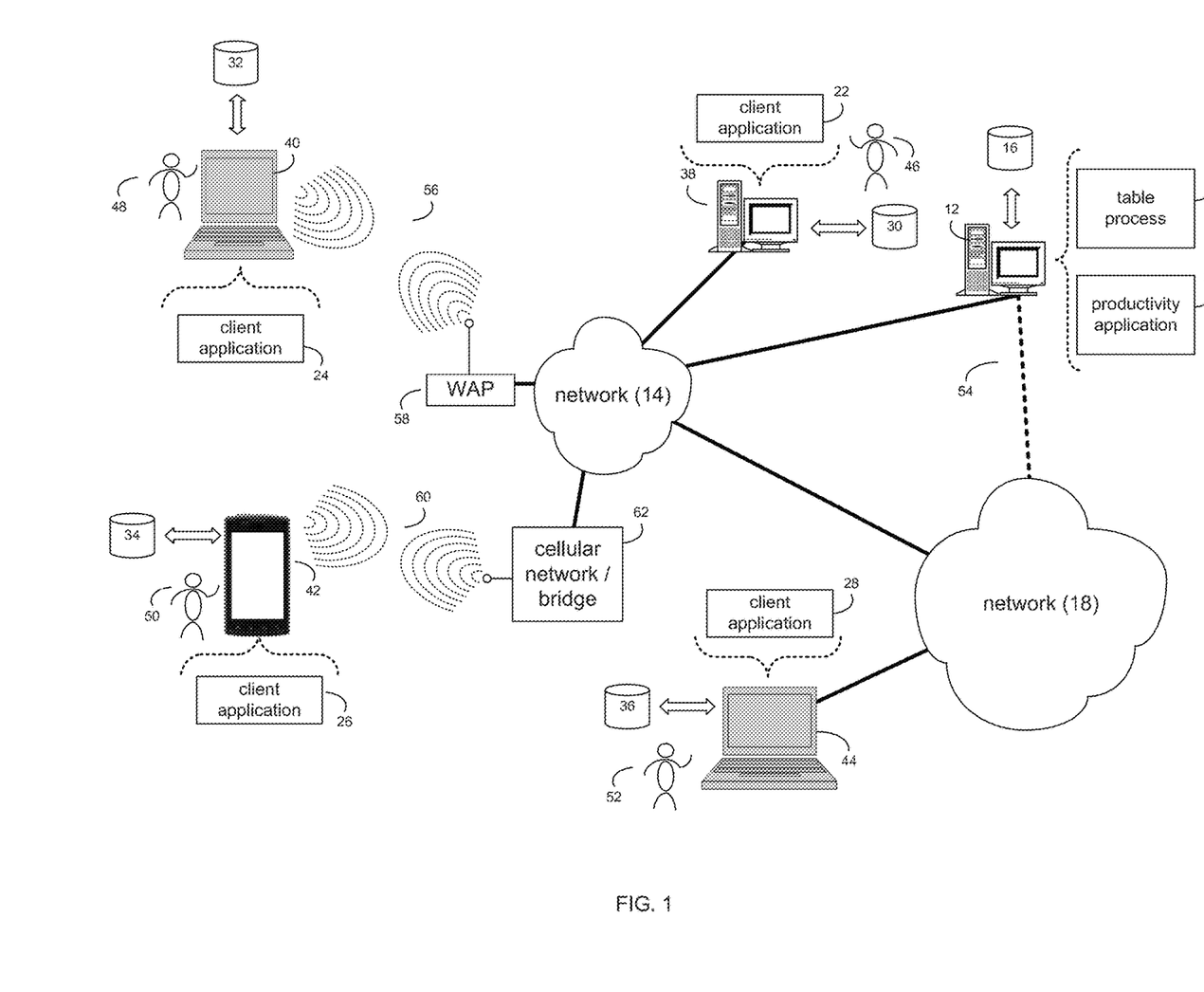
FIG. 1 is an example diagrammatic view of a table process coupled to a distributed computing network according to one or more example implementations of the disclosure.

Referring now to FIG. 1, there is shown table process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, table process 10 may detect creation of a first portion of a table and a second portion of the table, wherein the first portion of the table may include a first label and wherein the second portion of the table may include a second label. It may be determined that a pattern exists between the first label and the second label based upon, at least in part, historical use of the first label relative to the second label. The pattern between the first label and the second label may be automatically recreated in the third portion of a table and a fourth portion of the table based upon, at least in part, receiving at least a portion of the first label in the third portion of the table.

The instruction sets and subroutines of table process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "DB2" in order to provide multi-user access to one or more databases, such as the above noted relational database. The data store may also be a custom database, such as, for example, a flat file database or an XML database. Any other form(s) of a data storage structure and/or organization may also be used. Table process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a productivity application (e.g., productivity application 20), examples of which may include, but are not limited to, e.g., a word processing application, a spreadsheet application, a presentation creation, or other application that allows for the creation of files that may involve spreadsheets/tables. Table process 10 and/or productivity application 20 may be accessed via client applications 22, 24, 26, 28. Table process 10 may be a stand alone application, or may be an applet/application/script/extension that may interact with and/or be executed within productivity application 20, a component of productivity application 20, and/or one or more of client applications 22, 24, 26, 28. Productivity application 20 may be a stand alone application, or may be an applet/application/script/extension that may interact with and/or be executed within table process 10, a component of table process 10, and/or one or more of client applications 22, 24, 26, 28. One or more of client applications 22, 24, 26, 28 may be a standalone application, or may be an applet/application/script/extension that may interact with and/or be executed within and/or be a component of table process 10 and/or productivity application 20. Examples of client applications 22, 24, 26, 28 may include, but are not limited to, e.g., a word processing application, a spreadsheet application, a presentation creation, or other application that allows for the creation of files that may involve spreadsheets/tables, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of table process 10 (and vice versa). Accordingly, table process 10 may be a purely server-side application, a purely client-side application, or a hybrid server-side/client-side application that is cooperatively executed by one or more of client applications 22, 24, 26, 28 and/or table process 10.

One or more of client applications 22, 24, 26, 28 may be configured to effectuate some or all of the functionality of productivity application 20 (and vice versa). Accordingly, productivity application 20 may be a purely server-side application, a purely client-side application, or a hybrid server-side/client-side application that is cooperatively executed by one or more of client applications 22, 24, 26, 28 and/or productivity application 20. As one or more of client applications 22, 24, 26, 28, table process 10, and productivity application 20, taken singly or in any combination, may effectuate some or all of the same functionality, any description of effectuating such functionality via one or more of client applications 22, 24, 26, 28, table process 10, productivity application 20, or combination thereof, and any described interaction(s) between one or more of client applications 22, 24, 26, 28, table process 10, productivity application 20, or combination thereof to effectuate such functionality, should be taken as an example only and not to limit the scope of the disclosure.

Users 46, 48, 50, 52 may access computer 12 and table process 10 (e.g., using one or more of client electronic devices 38, 40, 42, 44) directly through network 14 or through secondary network 18. Further, computer 12 may be connected to network 14 through secondary network 18, as illustrated with phantom link line 54. Table process 10 may include one or more user interfaces, such as browsers and textual or graphical user interfaces, through which users 46, 48, 50, 52 may access table process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
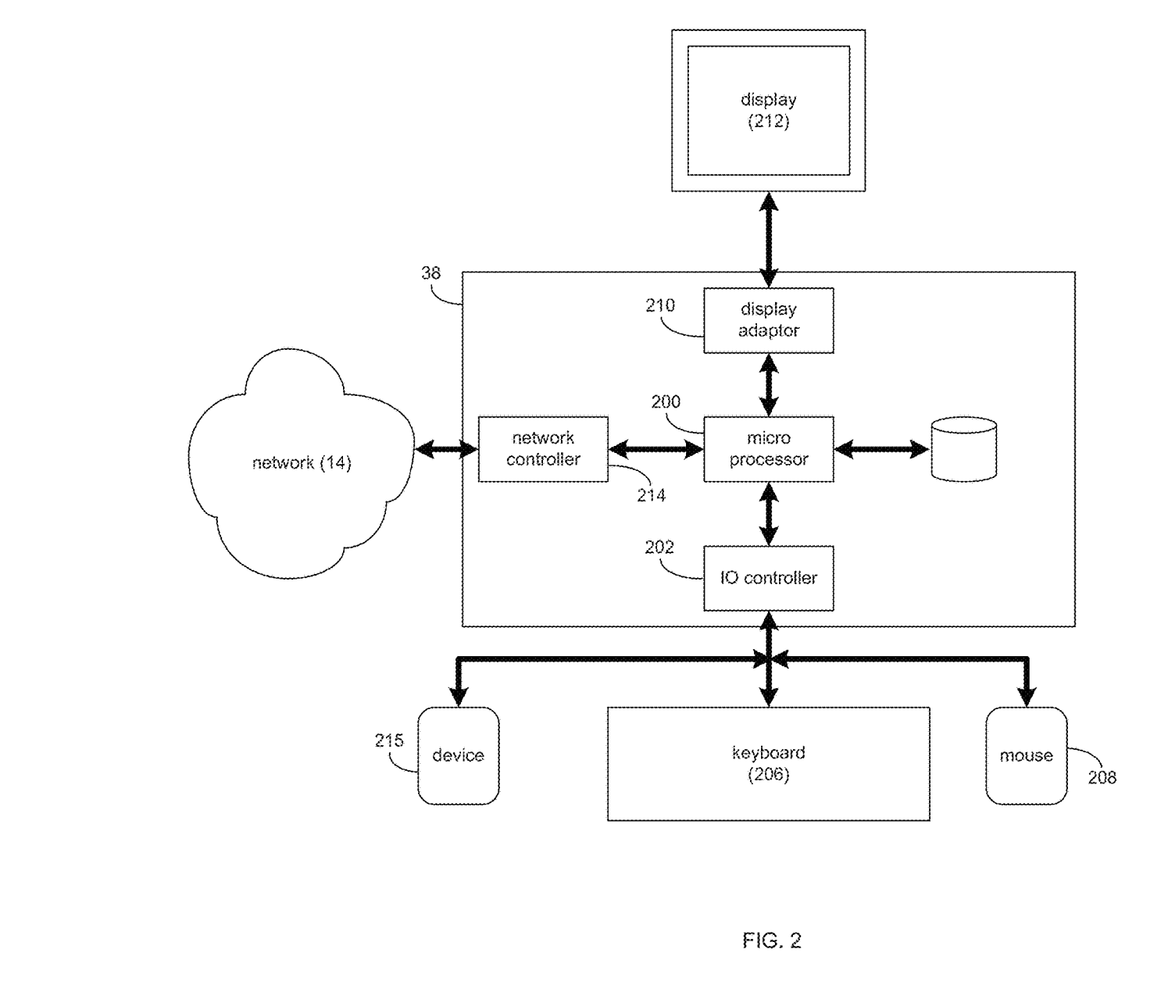
FIG. 2 is an example diagrammatic view of a client electronic device of FIG. 1 according to one or more example implementations of the disclosure.
Figure 3:
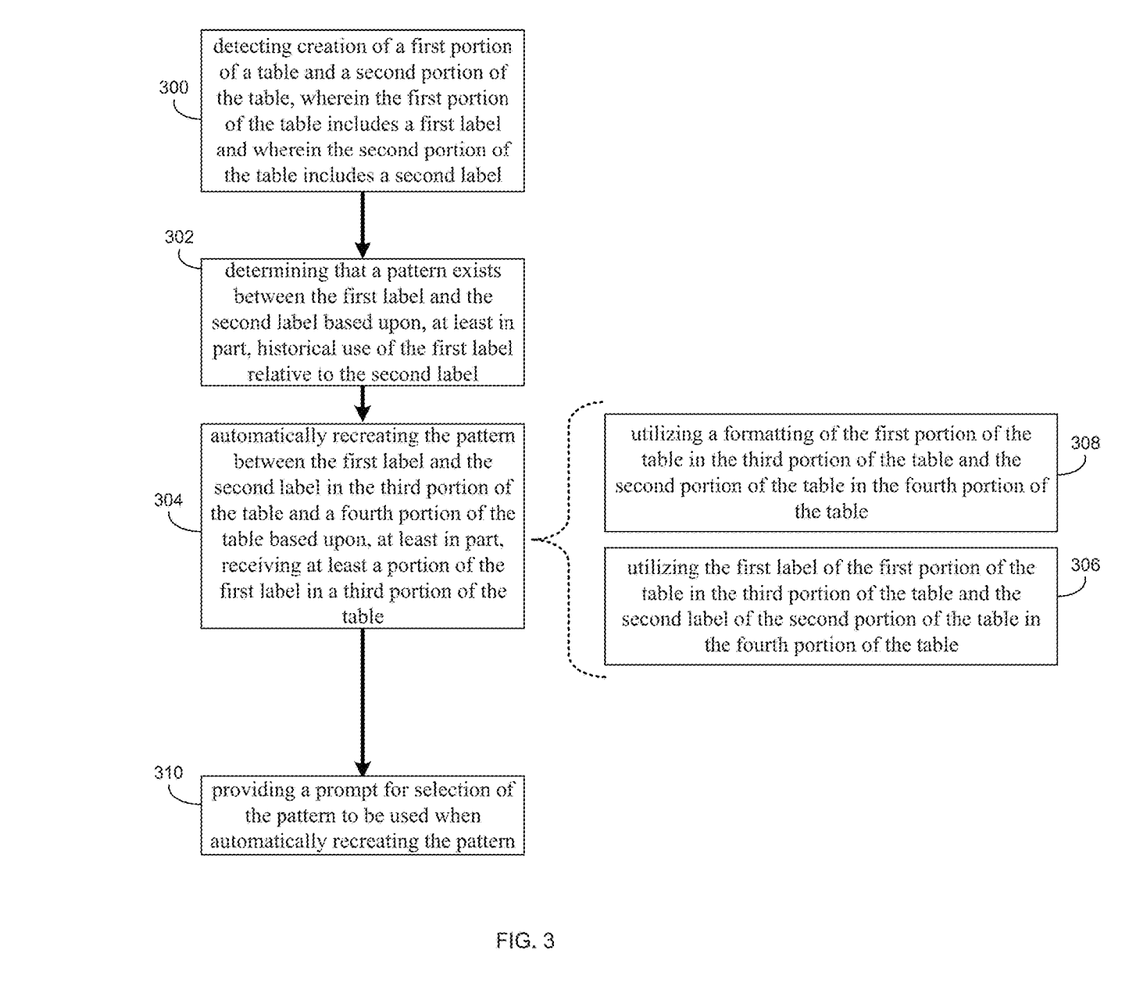
FIG. 3 is an example flowchart of the table process of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, table process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Table Process

As discussed above and referring also at least to FIGS. 3-8, table process 10 may detect 300 creation of a first portion of a table and a second portion of the table, wherein the first portion of the table may include a first label and wherein the second portion of the table may include a second label. Table process 10 may determine 302 that a pattern exists between the first label and the second label based upon, at least in part, historical use of the first label relative to the second label. Table process 10 may automatically recreate 304 the pattern between the first label and the second label in a third portion of the table and a fourth portion of the table based upon, at least in part, receiving at least a portion of the first label in the third portion of the table.

As noted above, in addition to desktops and laptops, to make users more agile and enable a fully connected employee, users (e.g., sales, tech sales, etc.) may find it beneficial to use smaller devices, such as tablets and smartphones. When using these smaller devices with traditional office productivity applications (e.g., word processing, presentations, spreadsheets, etc.), it may be difficult to navigate the productivity application, e.g., Form Factor, Full Screen, Infinite Scroll, Multi-Touch, Limited Resources, Menus/Properties Dialogs, etc. For example, when using spreadsheets on tablets, the smaller user interface may make it difficult, time consuming, and/or tedious to create spreadsheets, and/or their associated columns and rows.

As will be discussed in greater detail below, table process 10 may optimize the user experience when creating cells, columns, rows and sheets in a spreadsheet by, e.g., monitoring the creation of a cell, column, row and sheet, extracting the label of the new cell, column, row, sheet (and/or surrounding labels), and may predict (e.g., based on column name, the cell format, cell formulae, column format, column formula, etc.) the next likely column names, formula and formats. Table process 10 may thus provide an intuitive productivity mobile (or desktop) application and enrich the user experience, e.g., aid the rapid calculation, improve the templating experience, etc.).

For instance, in some implementations, and referring also at least to FIGS. 4-8, table process 10 may detect 300 creation of a first portion of a table and a second portion of the table, wherein the first portion of the table may include a first label and wherein the second portion of the table may include a second label. In some implementations, at least one of the first portion and the second portion may include at least one of a column and a row of the table. For instance, assume for example purposes only that a user (e.g., user 50) is creating a spreadsheet/table (e.g., via table process 10, productivity application 20, client application 26 or combination thereof) on user interface 400. In the example, the first portion of the table (e.g., portion 402) is part of a column and/or row of the table. Further in the example, the second portion of the table (e.g., portion 404) is part of a column and/or row of the table. This may be accomplished by table process 10 using, e.g., the common locations for these features far left column, top rows, etc. This may also be accomplished by table process 10 using the styles.

Figure 4:
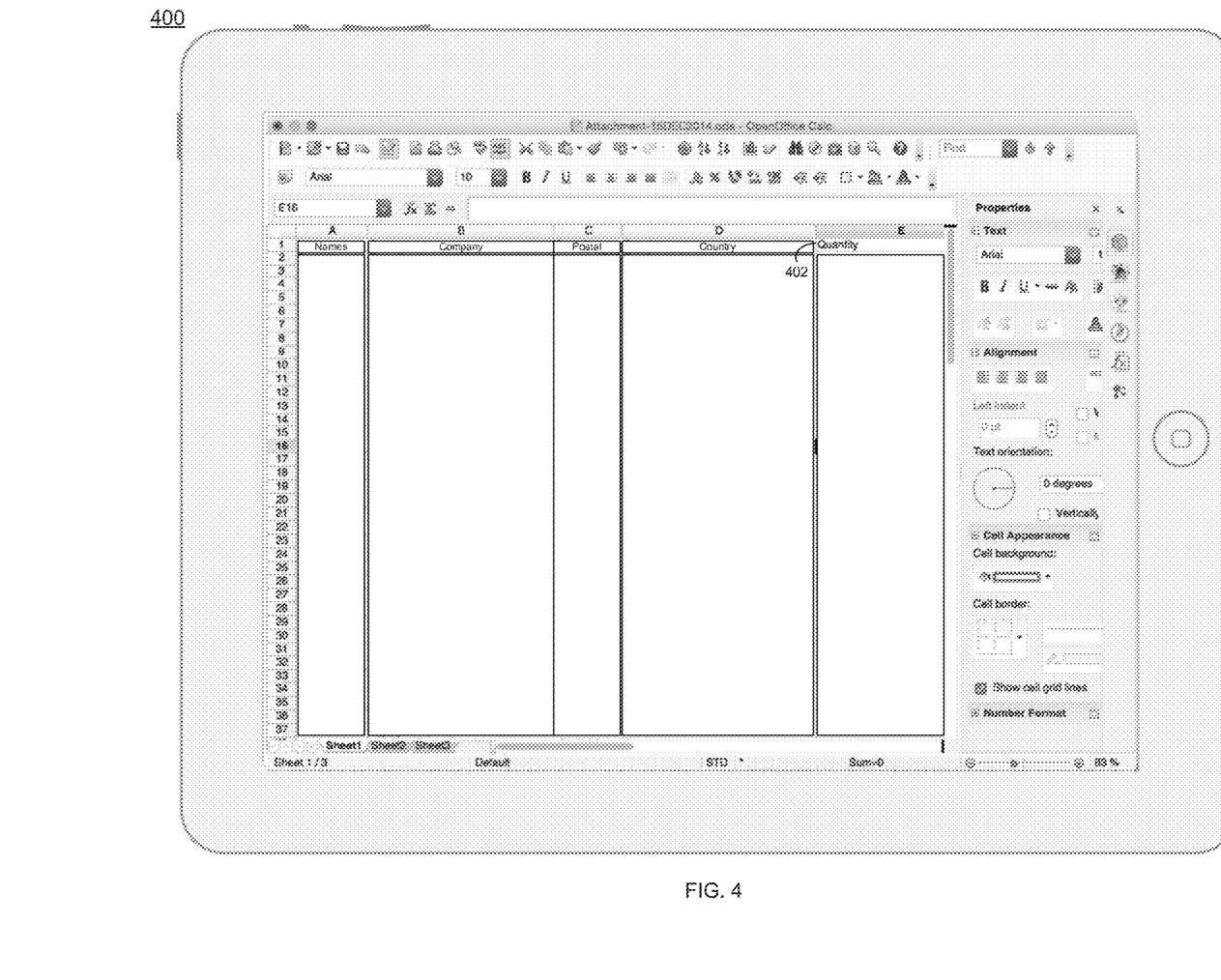
FIG. 4 is an example diagrammatic view of a screen image displayed by the table process of FIG. 1 according to one or more example implementations of the disclosure.

In some implementations, at least one of the first label and the second label may include a column heading. For instance, in the example, portion 402 has the label header "quantity" and portion 404 has the label header "item". The header may be a description of what information is included in a particular row/column.

In some implementations, table process 10 may determine 302 that a pattern exists between the first label and the second label based upon, at least in part, historical use of the first label relative to the second label. For instance, table process 10 may monitor the creation in real time to mine the patterns, e.g., if a new row is created, a new column is created, then store that value/relationship. In some implementations, table process 10 may identify the nearest neighbors of the content/style/spreadsheet. An example patterns may be [Edge of Sheet/Column-Quantity/Column-Price/Column]. Table process 10 may use known spreadsheet APIs, e.g., Apache POI, Microsoft Office®, OLE/VB APIs, etc. In some implementations, table process 10 may automatically walk the patterns, and if there are overlapping patterns, they may be created into a single output (e.g., quantity/column-price/column joins with price/column-location/column to be quantity/column-price/column-location/column).

The historical use of the first label relative to the second label may be from at least one of a same table and a different table. For instance, assume for example purposes only that user 50 (via table process 10) has created at least one other table using label header "quantity" and "item". In the example, the other table (shown in user interface 400) may be part of the same table (e.g., within a different "sheet" within the same spreadsheet file) or may be a table created from a different spreadsheet file. In some implementations, table process 10 may store the prior history based on such things as, e.g., role of the user, user, organization or job standards (financial/engineering/sales, etc.). For example, table process 10 may analyze a set of spreadsheets for common patterns, and may segment the set based on person/role. In some implementations, table process 10 may use an in memory map/store that stores the relationship between each label header (e.g., if "quantity" then "item", "tax").

Figure 5:
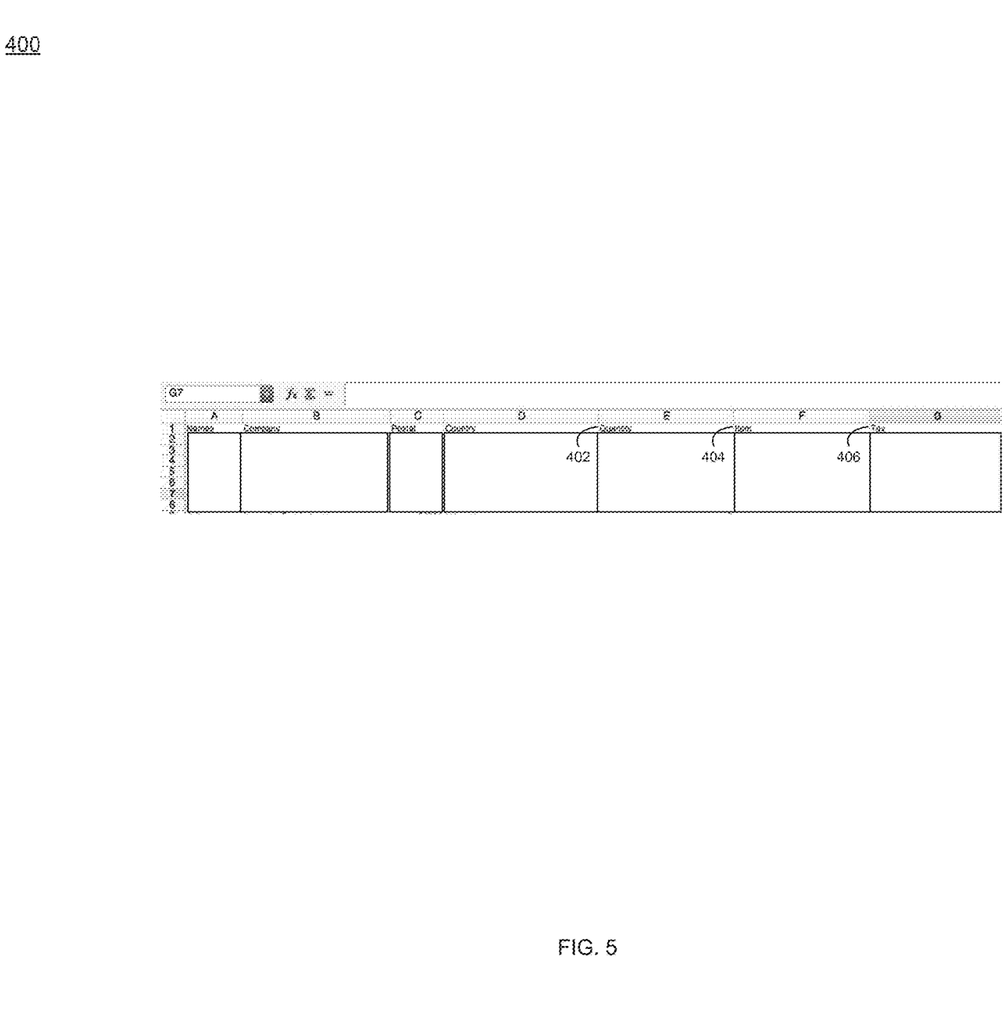
FIG. 5 is an example diagrammatic view of a screen image displayed by the table process of FIG. 1 according to one or more example implementations of the disclosure.

In some implementations, table process 10 may automatically recreate 304 the pattern between the first label and the second label in a third portion of the table and a fourth portion of the table based upon, at least in part, receiving at least a portion of the first label in the third portion of the table. For instance, assume for example purposes only that table process 10 has detected that a column, row or sheet is created. Such detection may be accomplished using, e.g., hooks on onNew or listening to events on a Document Object Model of the spreadsheet application. In the example, table process 10 may monitor or prompt user 50 for the label of the column (e.g., "quantity"). Further in the example, table process 10 may determine that, based upon the historical use of "quantity" as the column header label (e.g., from user interface 400), "quantity" is often used with "item". It will be appreciated that multiple columns (and/or rows) may be used in the pattern detection without departing from the scope of the disclosure. For example, table process 10 may determine that, based upon the historical use of "quantity" as the column header label, and may determine that "quantity" is often used with "item" and "tax" shown in portion 406. As such, the pattern may be expanded to include any complex pattern in the 2-dimensional space of a spreadsheet and may be based on related patterns of length 1, 2, 3, 4, 5 in length, and thus insert many columns/rows.

Figure 6:
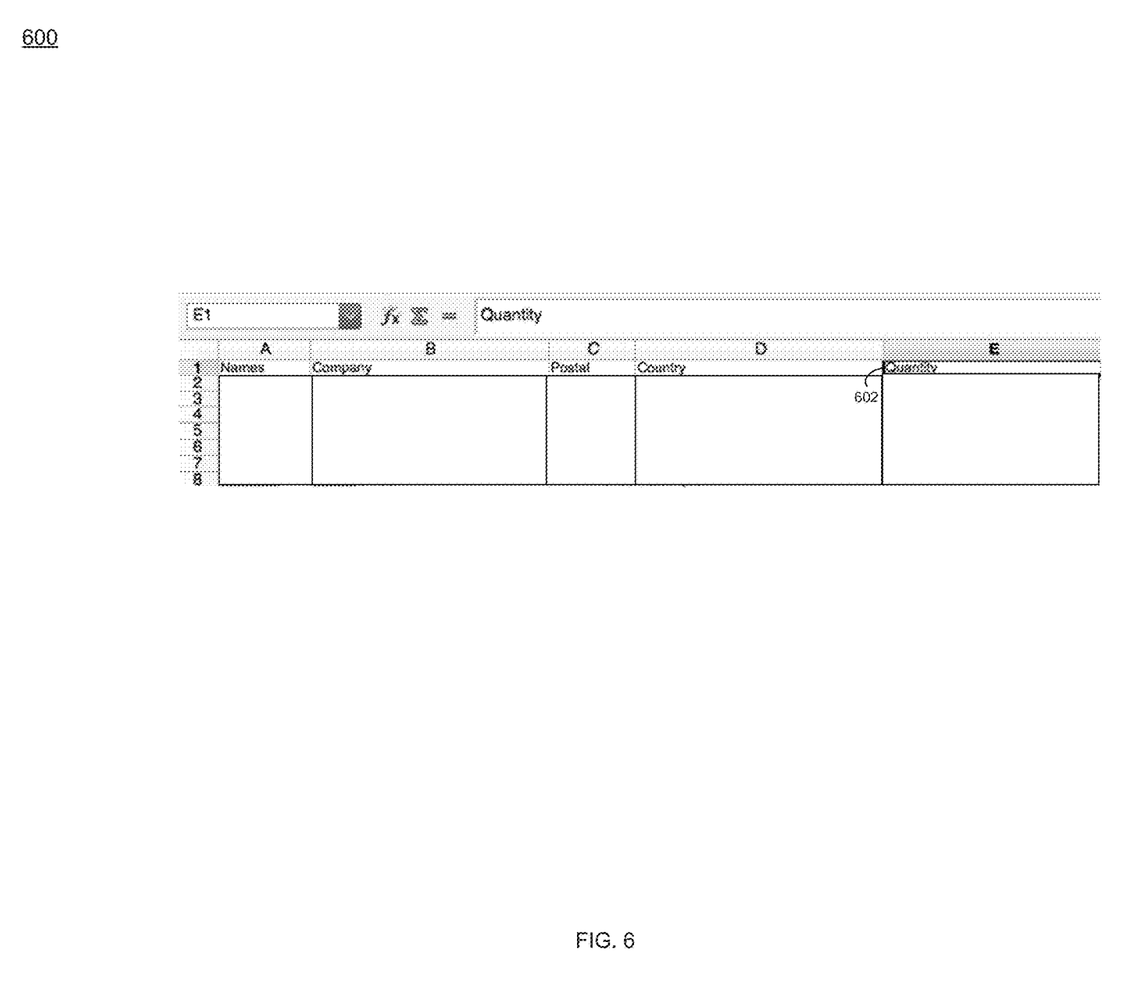
FIG. 6 is an example diagrammatic view of a screen image displayed by the table process of FIG. 1 according to one or more example implementations of the disclosure.
Figure 7:
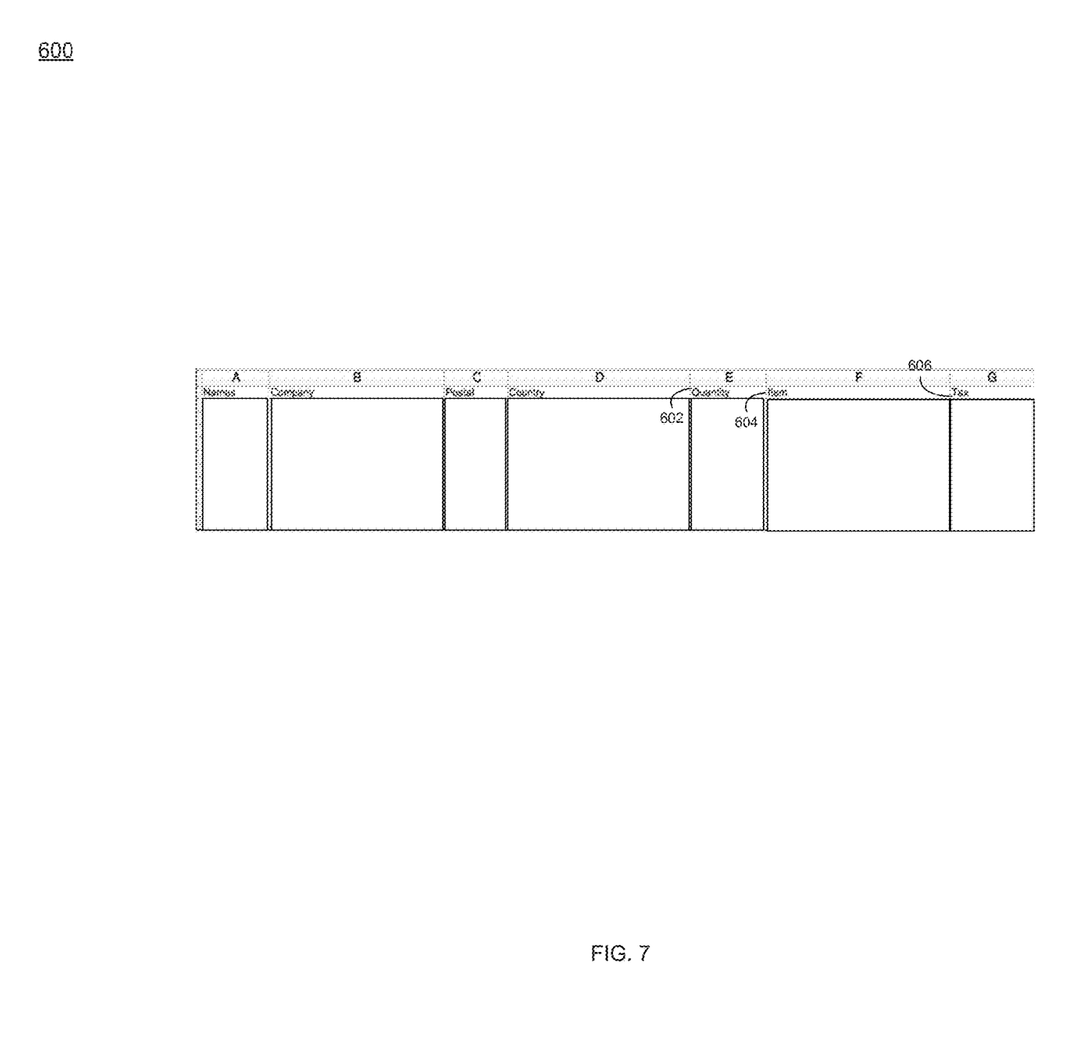
FIG. 7 is an example diagrammatic view of a screen image displayed by the table process of FIG. 1 according to one or more example implementations of the disclosure.

In some implementations, automatically recreating 304 the pattern between the first label and the second label may include utilizing 306 the first label of the first portion of the table in the third portion of the table and the second label of the second portion of the table in the fourth portion of the table. For instance, further assume that another spreadsheet/table is created via user interface 600. As table process 10 detects that the label "quantity" is being (or has been) inserted into the third portion of the table (e.g., portion 602), table process 10 may automatically recreate 304 the pattern between "quantity" and "item", "tax" by utilizing 306 the label for portions 602, 604, and 606 associated with "quantity", "item", and "tax" columns respectively.

In some implementations, automatically recreating 304 the pattern between the first label and the second label may include utilizing 308 a formatting of the first portion of the table in the third portion of the table and the second portion of the table in the fourth portion of the table. For instance, continuing with the above example, as table process 10 detects that the label "quantity" is being (or has been) inserted into the third portion of the table (e.g., portion 602), table process 10 may automatically recreate 304 the pattern between "quantity" and "item", "tax" by utilizing 308 the same formatting for portions 602, 604, and 606 associated with the "quantity", "item", and "tax" columns respectively. As an example, table process 10 may utilize and assign a format to those column cells as item:number and tax:$NUMBER.NUMBER. It will be appreciated that other example formats may be used without departing from the scope of the disclosure. Table process 10 may also look at the formula/pattern in the header itself (and the data related to the header) to automatically associate an automatic format/style to future use.

If more than one result is returned, table process 10 may use the next closest column, e.g., if "postal", "country", "quantity", then "item", "tax". In the example, table process 10 may maintain ordering, and only use formatted columns or a subset of columns. Table process 10 may modify the portions of the columns/rows/sheet with the new column labels and/or formatting.

Figure 8:
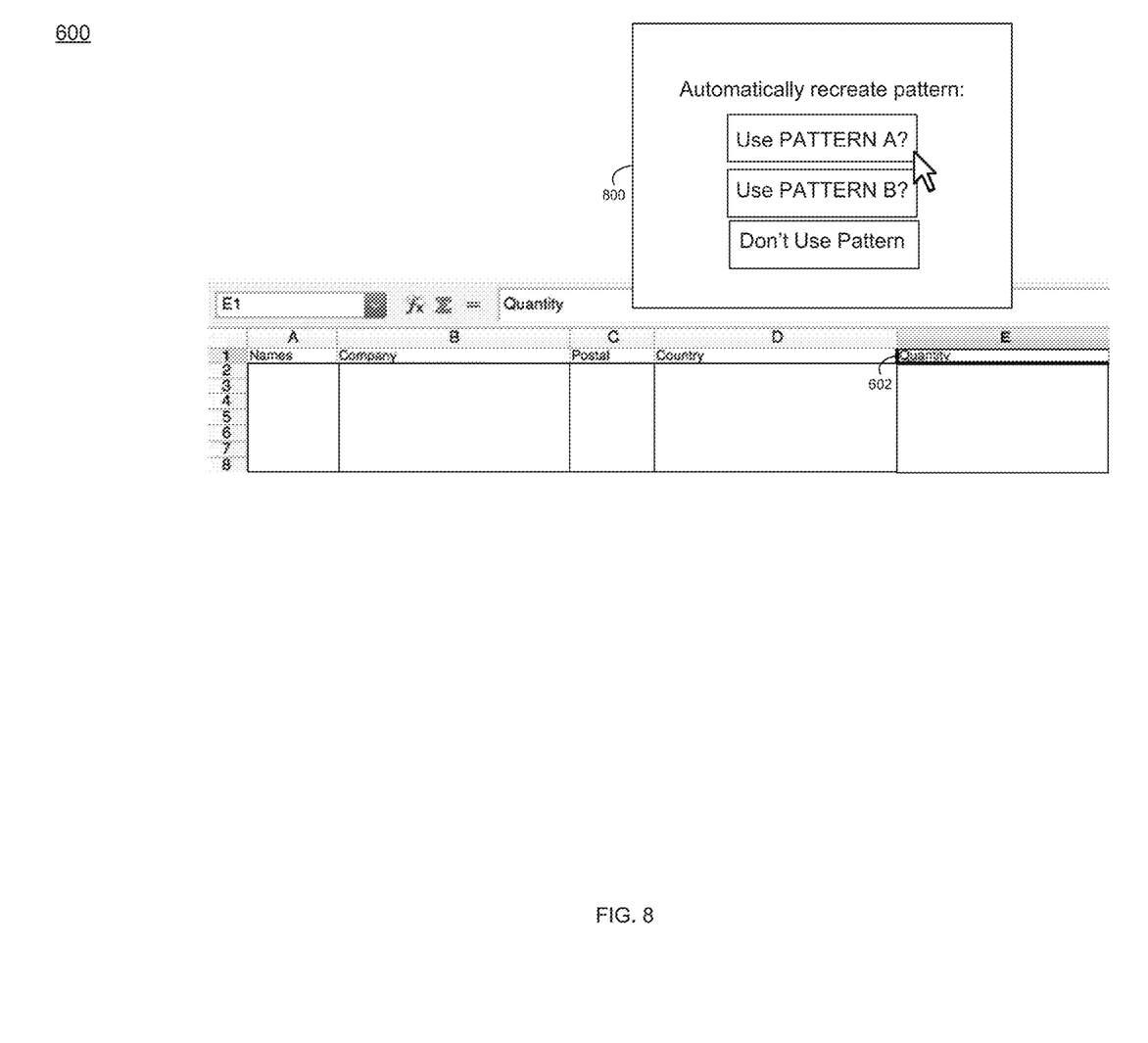
FIG. 8 is an example diagrammatic view of a screen image displayed by the table process of FIG. 1 according to one or more example implementations of the disclosure.

In some implementations, a prompt for selection of the pattern to be used may be provided 310 by table process 10 when automatically recreating 304 the pattern. For instance, assume for example purposes only that table process 10 has determined 302 that two or more patterns exist between the first label and the second label based upon, at least in part, historical use of the first label relative to the second label. In the example the first pattern may be PATTERN A and the second pattern may be PATTERN B. Continuing with the above example, based upon receiving at least a portion of the first label (e.g., (quantity") in the third portion of the table, table process 10 may provide 310 a prompt (e.g., prompt 800) that may enable user 50 (e.g., via table process 10) to select (e.g., via pointing device or touch screen) which pattern to use when automatically recreating 304 the pattern. In some implementations, table process 10 may provide 310 a prompt as a popup for the table/column/row/cell description, and a wizard displaying the suggested table/column(s)/row(s)/cell(s) to use as the template. Table process 10 may leverage performance enhancements when auto-formatting cells/columns/rows with formulas. In some implementations, table process 10 may recognize custom input gestures (e.g., swiping left, right, up, down, diagonal, etc.) to automatically insert and format columns as discussed above.

In some implementations, table process 10 may be implemented as a type ahead. For instance, table process 10 may analyze previous columns and rows as discussed above. In the example, as user 50 types a column name, such as "people", table process 10 may automatically lay out matching patterns—the pattern with the highest confidence may be laid out first. For example, user 50 types column B—P-x. Table process 10 may detect 300 PE is inserted into a column header. Table process 10 may check if there is a prior column heading, such as Billing #. In the example, table process 10 may develop a proposed pattern, e.g., [Billing #, P-x]. Assume that at this point, table process 10 does not determine 302 a matching pattern for the proposed pattern. Further assume that user 50 now re-types column B—P-e-o. In the example, table process 10 may develop a proposed pattern to automatically recreate 304, e.g., [Billing #, P-e-o], [P-e-o]. In the example, table process 10 may determine 302 a matching pattern [People-First Name-Last Name-Serial #] [People-Serial #]. In some implementation, table process 10 may lay out the pattern in the column in a shadowed grey showing a suggested pattern. In some implementations, table process 10 may present a series of drop downs to select the preferred column heading (e.g., via popup 800). In the example, user 50 may select the preferred pattern, e.g., [People-First Name-Last Name-Serial #]. In the example, table process 10 may change the column headings to [Billing #-People-First Name-Last Name-Serial #].

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer program product comprising a non-transitory computer readable storage medium having a plurality of instructions stored thereon which, when executed by a processor, cause the processor to perform operations comprising:
    detecting creation of a first portion of a table and a second portion of the table, wherein the first portion of the table includes a first label header and wherein the second portion of the table includes a second label header, wherein the first label header and the second label header each include a description of information included in one or more of a row and a column associated with each label header;
    analyzing a set of spreadsheets for common patterns, and segmenting the set of spreadsheets based upon one or more of person and role;
    determining that a pattern exists between the first label header and the second label header based upon, at least in part, historical use of the first label header relative to the second label header; and
    automatically recreating the pattern between the first label header and the second label header in a third portion of the table and a fourth portion of the table based upon, at least in part, receiving at least a portion of the first label header in the third portion of the table, wherein automatically recreating the pattern between the first label header and the second label header includes expanding the pattern to include a number of complex patterns based upon one or more related patterns of length, wherein the number of complex patterns includes a plurality of rows and a plurality of columns associated with each label header, wherein the plurality of rows and the plurality of columns originate from at least one of a combination of spreadsheets within the set of spreadsheets of a first spreadsheet file and a second spreadsheet file, and wherein automatically recreating the pattern includes applying a formatting to at least one of the third portion of the table and the fourth portion of the table that is different from the formatting of at least one of the first portion of the table and the second portion of the table,
    and wherein formatting at least one of the third portion of the table and fourth portion of the table is based on a format of a next closest column.

2. The computer program product of claim 1 wherein at least one of the first portion and the second portion includes at least one of a column and a row of the table.

3. The computer program product of claim 1 wherein at least one of the first label header and the second label header includes a column heading.

4. The computer program product of claim 1 wherein the historical use of the first label header relative to the second label header is from at least one of a same table and a different table.

5. The computer program product of claim 1 wherein automatically recreating the pattern between the first label header and the second label header includes utilizing a formatting of the first portion of the table in the third portion of the table and the second portion of the table in the fourth portion of the table.

6. The computer program product of claim 1 wherein automatically recreating the pattern between the first label header and the second label header includes utilizing the first label header of the first portion of the table in the third portion of the table and the second label header of the second portion of the table in the fourth portion of the table.

7. The computer program product of claim 1 further comprising providing a prompt for selection of the pattern to be used when automatically recreating the pattern.

8. A computing system including a processor and a memory configured to perform operations comprising:
  detecting creation of a first portion of a table and a second portion of the table, wherein the first portion of the table includes a first label header and wherein the second portion of the table includes a second label header, wherein the first label header and the second label header each include a description of information included in one or more of a row and a column associated with each label header;
  analyzing a set of spreadsheets for common patterns, and segmenting the set of spreadsheets based upon one or more of person and role;
  determining that a pattern exists between the first label header and the second label header based upon, at least in part, historical use of the first label header relative to the second label; and
  automatically recreating the pattern between the first label header and the second label header in a third portion of the table and a fourth portion of the table based upon, at least in part, receiving at least a portion of the first label header in the third portion of the table, wherein automatically recreating the pattern between the first label header and the second label header includes expanding the pattern to include a number of complex patterns based upon one or more related patterns of length, wherein the number of complex patterns includes a plurality of rows and a plurality of columns associated with each label header, wherein the plurality of rows and the plurality of columns originate from at least one of a combination of spreadsheets within the set of spreadsheets of a first spreadsheet file and a second spreadsheet file, and wherein automatically recreating the pattern includes applying a formatting to at least one of the third portion of the table and the fourth portion of the table that is different from the formatting of at least one of the first portion of the table and the second portion of the table,
  and wherein formatting at least one of the third portion of the table and fourth portion of the table is based on a format of a next closest column.

9. The computing system of claim 8 wherein at least one of the first portion and the second portion includes at least one of a column and a row of the table.

10. The computing system of claim 8 wherein at least one of the first label header and the second label header includes a column heading.

11. The computing system of claim 8 wherein the historical use of the first label header relative to the second label header is from at least one of a same table and a different table.

12. The computing system of claim 8 wherein automatically recreating the pattern between the first label header and the second label header includes utilizing a formatting of the first portion of the table in the third portion of the table and the second portion of the table in the fourth portion of the table.

13. The computing system of claim 8 wherein automatically recreating the pattern between the first label header and the second label header includes utilizing the first label header of the first portion of the table in the third portion of the table and the second label header of the second portion of the table in the fourth portion of the table.

* * * * *